(12) United States Patent
Espinor et al.

(10) Patent No.: US 7,293,188 B2
(45) Date of Patent: Nov. 6, 2007

(54) LOW VOLTAGE DETECTION SYSTEM

(75) Inventors: George L. Espinor, Austin, TX (US); William L. Lucas, Mechanicsville, VA (US); Michael C. Wood, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 739 days.

(21) Appl. No.: 10/292,323

(22) Filed: Nov. 12, 2002

(65) Prior Publication Data

US 2004/0093531 A1 May 13, 2004

(51) Int. Cl.
*G06F 1/28* (2006.01)
(52) U.S. Cl. .................... 713/340; 713/300
(58) Field of Classification Search ............... 713/300, 713/340
See application file for complete search history.

(56) References Cited

U.S. PATENT DOCUMENTS

| | | | |
|---|---|---|---|
| 5,203,000 A | 4/1993 | Folkes et al. | |
| 5,241,680 A | 8/1993 | Cole et al. | |
| 5,423,045 A | 6/1995 | Kannan et al. | |
| 5,428,252 A | 6/1995 | Walker et al. | |
| 5,539,910 A * | 7/1996 | Brueckmann et al. | 713/340 |
| 5,798,701 A * | 8/1998 | Bernal et al. | 340/628 |
| 6,711,692 B1 * | 3/2004 | Maeda et al. | 713/324 |
| 2003/0035377 A1* | 2/2003 | Ju | 370/245 |

OTHER PUBLICATIONS

Samsung User's Manual S3C80F7/C80F9/C80G7/C80G9 8-Bit CMOS Microcontroller, Revision 1, 2002.

* cited by examiner

*Primary Examiner*—Rehana Perveen
*Assistant Examiner*—Tse Chen
(74) *Attorney, Agent, or Firm*—Joanna G. Chiu; David G. Dolezal

(57) ABSTRACT

A low voltage detection (LVD) system for a logic device includes a first LVD circuit (110) to provide an indicator when a supply pin voltage (109) falls below a first voltage level, and a second LVD circuit (116) to provide an interrupt (118) when the supply pin voltage falls below a second voltage level. In one embodiment, the second LVD circuit consumes more power than the first LVD circuit, and is therefore selectively enabled. In one embodiment, when the supply pin voltage is between the first and second voltage levels and the logic device is in a stop or low power mode, the second LVD circuit is periodically enabled to monitor the supply pin voltage. After the supply pin voltage falls below the second voltage level, the logic device is placed in a safe state where the logic device is inhibited from acknowledging interrupts until the supply pin voltage rises above the first voltage level.

20 Claims, 3 Drawing Sheets

| LV1_Detect 112 | safe 136 | IH_block 140 |
|---|---|---|
| 0 ($V_{BATT}$ > LV1) | 0 | 0 (INTERRUPTS ALLOWED) |
| 0 | 1 | 0 |
| 1 ($V_{BATT}$ ≤ LV1) | 0 | 0 |
| 1 | 1 | 1 (INTERRUPTS BLOCKED) |

| wakeup 126 | STOP 132 | LVD2_en 130 |
|---|---|---|
| 0 | 0 (RUN MODE) | 1 (LVD2 ENABLED) |
| 0 | 1 (STOP MODE) | 0 (LVD2 DISABLED) |
| 1 | 0 | 1 |
| 1 | 1 | 1 |

| LV1_Detect 112 | safe 136 | STOP 132 | PWU_en 122 |
|---|---|---|---|
| 0 | 0 | 0 | 0 (PWU DISABLED) |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 (PWU ENABLED) |
| 1 | 1 | 0 | 0 |
| 1 | 1 | 1 | 0 |
*FIG. 5*
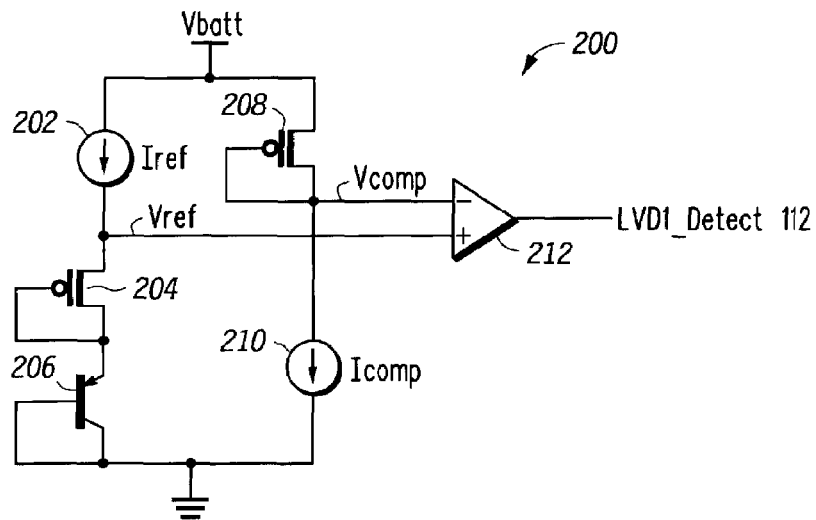
*FIG. 6*
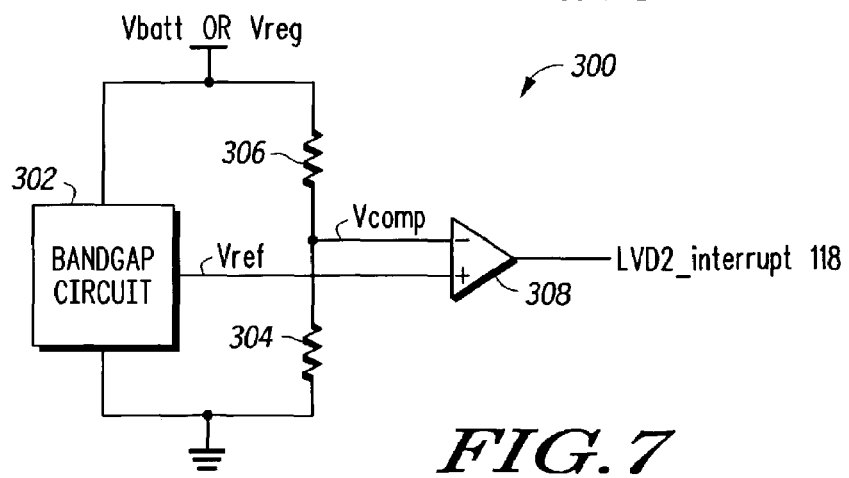
*FIG. 7*

LOW VOLTAGE DETECTION SYSTEM

RELATED APPLICATION

This is related to U.S. patent application Ser. No. 09/261,875 filed Mar. 2, 1999, and entitled "Method for Detecting and for Responding to Detection of a Battery to a Logic Device and Systems Relating Thereto" and assigned to the current assignee hereof.

FIELD OF THE INVENTION

The present invention relates generally to low voltage detection systems, and more specifically, to low voltage detection systems having multiple voltage detection levels.

RELATED ART

In many battery powered systems, such as those in the portable electronics market, logic devices, such as microprocessors and microcontrollers, play the role of the main controller and/or the power management unit. In this role, it is important to protect the logic device's internal logic states and volatile memory (RAM, control registers, logic states, etc.) when batteries become weak or are removed. For example, in microcontrollers available today, low voltage detection (LVD) circuits detect when a low battery voltage occurs and resets the microcontroller. Alternatively, some LVD systems allow the microcontroller to receive an interrupt rather than a reset such that software can then place the microcontroller into a stop mode to minimize current consumption until the battery voltage is restored. However, in these systems, while in stop mode, an interrupt (such as from a keyboard input) may be received, causing the microcontroller to start up again prior to the battery voltage being restored and drain the battery such that data is lost. Therefore, a need exists to provide a LVD system which protects a logic device's internal logic states and volatile memory, while allowing for a safe restoration from a weak or removed battery condition. Also, in order to reduce cost, there is a need to provide such a system using a minimal number of pins of the logic device.

BRIEF DESCRIPTION OF THE DRAWINGS

The present invention is illustrated by way of example and not limited by the accompanying figures, in which like references indicate similar elements, and in which:

FIG. 2 illustrates, in graph form, a method of entering and exiting a safe state, in accordance with one embodiment of the present invention;

FIGS. 3-5 illustrate truth tables corresponding to various units within the data processing system of FIG. 1;

FIG. 6 illustrates, in schematic form, one embodiment of a low voltage detect unit within the data processing system of FIG. 1; and FIG. 7 illustrates, in schematic form, one embodiment of another low voltage detect unit within the data processing system of FIG. 1.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" and "negate" (or "deassert") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
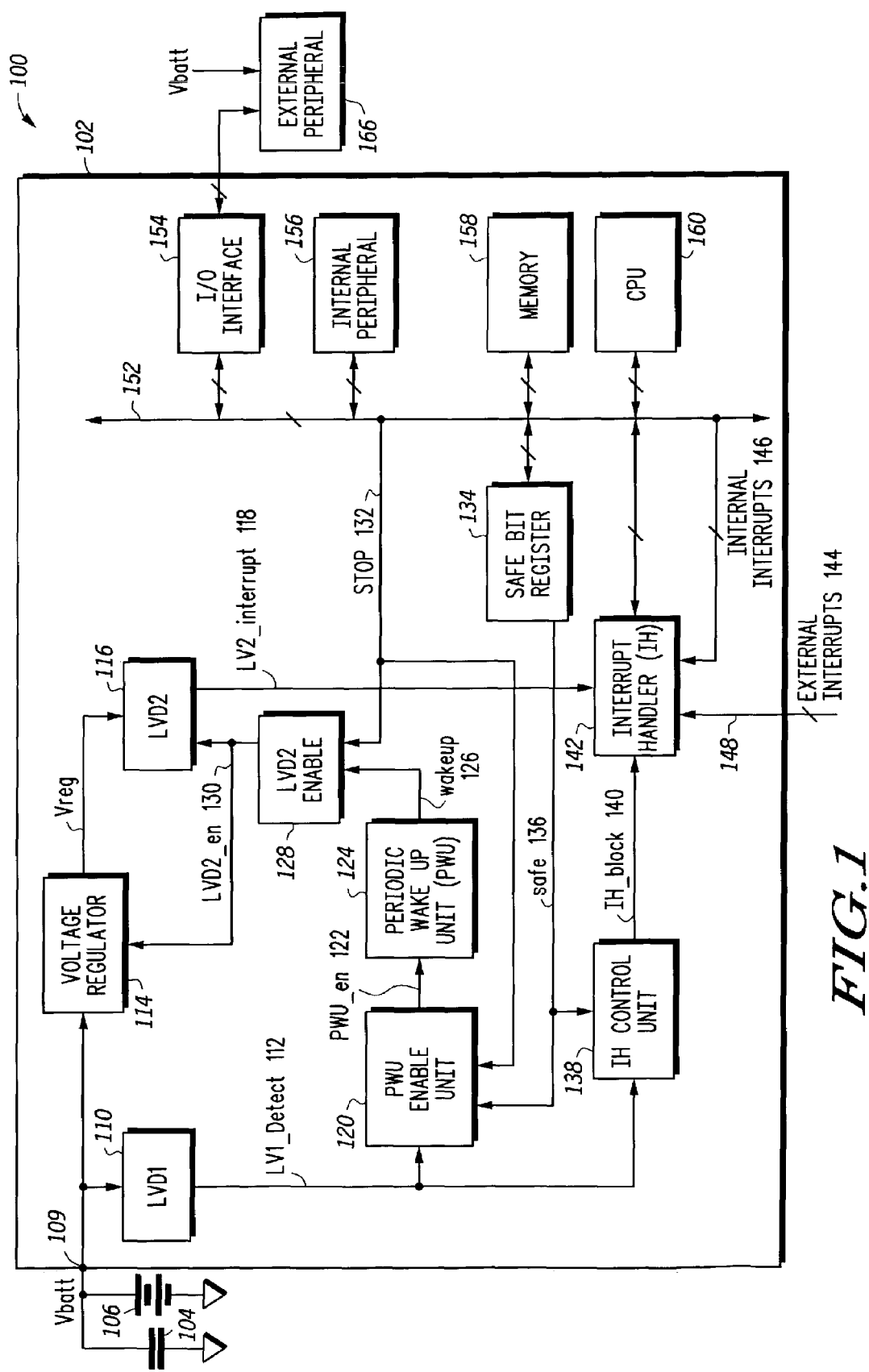
FIG. 1 illustrates, in block diagram form, a data processing system in accordance with one embodiment of the present invention.

FIG. 1 illustrates, in block diagram form, one embodiment of a data processing system 100. Data processing system 100 includes a logic device, such as microcontroller (MCU) 102, along with external circuitry, as illustrated in FIG. 1. In alternate embodiments, MCU 102 can be replaced with various microprocessors, microcontrollers, or other types of logic devices, wherein in one embodiment, MCU 102 (or any of the other types of logic device) is located on a single integrated circuit. MCU 102 includes central processing unit (CPU) 160, memory 158, internal peripherals 156, input/output (I/O) interface 154, safe bit register 134, and interrupt handler (IH) 142, which are all bidirectionally coupled to bus 152. (Note that as used herein, bus 152 includes address, data, and control signals.)

MCU 102 also includes an LVD1 unit 110 coupled to a battery node 109 (i.e. a power supply pin) which provides a voltage Vbatt. LVD1 110 detects when Vbatt falls below a first voltage level, LV1. MCU 102 also includes an LVD2 unit 116 which detects when Vbatt falls below a second voltage level, LV2, where generally, LV1 is greater than LV2. MCU 102 may also include a voltage regulator 114 coupled to battery node 109 and LVD2 116 for providing Vreg to LVD2 116. However, in alternate embodiments, voltage regulator 114 may not be present, in which case, LVD2 116 is coupled to battery node 109. MCU 102 also includes a periodic wakeup unit (PWU) 124, a PWU enable unit 120, LVD2 enable unit 128, and an interrupt handler (IH) control unit 138. Bus 152 provides a STOP mode indicator, STOP 132, to LVD2 enable unit 128 and PWU enable unit 120. LVD1 110 provides a signal, LV1_Detect 112, to PWU enable unit 120 and IH control unit 138. PWU enable unit 120 provides a signal, PWU_en 122, to PWU 124, and PWU 124 provides a signal, wakeup 126, to LVD2 enable unit 128. LVD2 enable unit 128 provides a signal, LVD2_en 130 to LVD 116 and to voltage regulator 114, if present. Safe bit register 134 provides a signal, safe 136, to PWU enable unit 120 and IH control unit 138. Interrupt handler 142 receives a signal, LV2_interrupt 118, from LVD2 116, a signal, IH_block 140, from IH control unit 138, internal interrupts 146 via bus 152, and external interrupts 144 via bidirectional conductors 148.

The external circuitry of data processing system 100 includes a battery 106 that is connectable to battery node 109, charge element 104, and external peripherals 166. Note that charge element 104 is illustrated as a capacitor in FIG. 1 (and may therefore be referred to as capacitor 104 or power storage capacitor 104). However, note that battery 106 can be replaced with a rechargeable battery that may be recharged by a charging circuit (which would therefore replace capacitor 104). Also, battery 106 can be replaced with any appropriate power source. As illustrated in FIG. 1, a first terminal of battery 106 and a first terminal of capacitor 104 are coupled to battery node 109. A second terminal of battery 106 and a second terminal of capacitor 104 are coupled to ground. Also note that, although not illustrated in FIG. 1, each of the units illustrated within MCU 102 is coupled to battery node 109 or the output of voltage regulator 114 (if present). I/O interface 154 is bidirectionally coupled to external peripherals 166. Note that external peripherals 166 may include a variety of peripherals, such as, for example, keyboard, display, other processors, etc.

In operation, capacitor 104 filters out noise from battery node 109 and provides bounce protection for high frequency bounces when battery 106 is connected to node 109. When battery 106 is removed, capacitor 30 supplies battery node 109 with enough voltage to retain RAM memory, control registers, logic states, etc., within MCU 102, for an extended period of time during a low power state. Also, note that in the illustrated embodiment, a single voltage supply pin (battery node 109) is used to supply power to MCU 102 and used to detect low voltage conditions resulting from a weak or removed battery, as will be described in more detail below.

I/O interface 154, internal peripherals 156, memory 158, and CPU 160 operate as known in the art and will not be discussed in detail herein. That is, only the aspects of each of these units relevant to the low voltage detection system described herein will be discussed. Operation of the low voltage detection system of MCU 102 (including LVD1 110, LVD2 116, optional voltage regulator 114, PWU enable unit 120, PWU 124, LVD2 enable unit 128, safe bit register 134, IH control unit 138, interrupt handler 142, and CPU 160) will be discussed in more detail with reference to FIGS. 2-7.

In one embodiment, MCU 102 is capable of operating normally in a run or stop mode so long as Vbatt remains above a minimum operating voltage, Vmin, of MCU 102. In run mode, MCU 102 is capable of executing instructions while the stop mode is a low power mode where MCU 102 is unable to execute instructions. MCU 102 can enter stop mode from run mode through the execution of a stop instruction. MCU 102 may exit stop mode and enter run mode in response to external interrupts 144 or internal interrupts 146. For example, an external interrupt may include a keyboard interrupt such that a user may wake up MCU 102 with the pressing of a key. However, if MCU 102 is transitioned from stop mode to run mode while Vbatt is below Vmin, operation of MCU 102 may be faulty because it will be running below its minimum operating voltage, i.e. operating outside of its specified operating range. Therefore, in one embodiment, when Vbatt falls below Vmin (due to either a weakened or removed battery), MCU 102 enters a safe state in which MCU 102 is inhibited from acknowledging any external or internal interrupts. Only upon Vbatt rising above a safe operating voltage (due to the replacement of the weak or removed battery or due to the recharging of the battery) is safe state exited such that MCU 102 may resume normal operation where MCU 102 is no longer inhibited from acknowledging interrupts. At this point, MCU 102 can safely be returned to run mode.

In one embodiment, the low voltage detection system of MCU 102 uses a first low voltage detection unit (LVD1 110) to detect when Vbatt is below LV1 (where LV1 corresponds to a safe operating voltage for MCU 102). In this embodiment, MCU 102 uses a second voltage detection unit (LVD2 116) to detect when Vbatt is below LV2, which is generally below LV1 but above Vmin. As described above, once Vbatt falls below LV2, MCU 102 is placed into a safe state where MCU 102 is no longer able to re-enter the run mode and is inhibited from acknowledging any external or internal interrupts until Vbatt rises above LV1. In the illustrated embodiment, LVD1 110 is a low power consuming voltage detection circuit which operates in all normal modes of MCU 102, including both run and stop modes. However, since LVD1 110 is designed to consume minimal power (an example of which will be discussed in reference to FIG. 6 below), LVD1 110 is not sufficiently accurate to ensure that MCU 102 remains above Vmin while guaranteeing maximum battery life. LVD2 116, though, is designed to provide an accurate low voltage indication; however, LVD2 116 draws more current in order to do so. Therefore, LVD1 110 provides an indicator (i.e. asserts LV1_Detect 112) when Vbatt is roughly LV1 (due to the inaccuracy caused by the low power consumption) and, LVD2 116 provides an interrupt (i.e. asserts LV2_interrupt 118) when Vbatt reaches LV2. Note that in the current embodiment, LVD2 116 is always enabled during run mode. However, since LVD2 116 consumes more power, it is not desirable to allow LVD2 116 to be enabled while MCU 102 is in stop mode. That is, unlike LVD1 110 which is always enabled, LVD2 116 can be selectively enabled, as needed, while MCU 102 is in stop mode.

Note that in the above description, and in the descriptions that follow, LVD2 116 monitors Vbatt to detect when Vbatt is below LV2. This is assuming that optional voltage regulator 114 is not present in MCU 102 (that is, that LVD2 116 receives Vbatt directly rather than Vreg). However, note that if voltage regulator 114 is present as shown in MCU 102, LVD2 116 (coupled to voltage regulator 114) receives Vreg and therefore may actually detect when Vreg is below LV2. Therefore, in this embodiment, the actual value used for LV2 may be adjusted based on the voltage drop introduced by voltage regulator 114. Regardless of whether Vreg or Vbatt is monitored, though, LVD2 116 provides an LV2_interrupt 118 when Vbatt falls below a second threshold, LV2. Also, note that when Vbatt approaches voltage levels near LV2, the voltage drop across voltage regulator 114 drops off to where Vbatt is approximately the same as Vreg. Therefore, for ease of explanation herein, the following descriptions will refer to LVD2 monitoring Vbatt rather than Vreg, but those of ordinary skill in the art can appreciate that monitoring Vreg can accomplish the same results.

Figures 2, 3, 4:
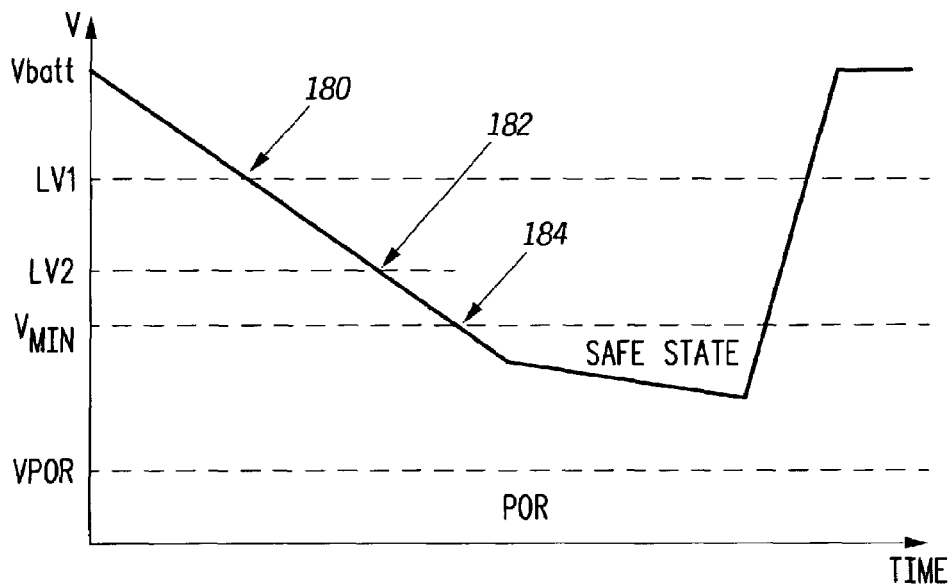

FIG. 2 illustrates, in graph form, a method of entering and exiting a safe state in accordance with one embodiment of the present invention. As Vbatt begins to decline, either due to a weakening battery or a removed battery (where Vbatt is being provided by capacitor 104), LVD1 110 detects when Vbatt reaches roughly LV1, which is illustrated in FIG. 2 by point 180. Upon reaching point 180, if MCU 102 is operating in stop mode, LVD2 116 is periodically enabled to provide an accurate low voltage detection.

For example, referring back to FIG. 1, PWU enable unit 120 enables PWU 124 based on LV1_Detect 112, safe 136, and STOP 132. That is, PWU enable unit 120 asserts PWU_en 122 (to enable PWU 124) when the values of LV1_Detect 112, safe 136, and STOP 132 are as shown in the truth table of FIG. 5. That is, as seen in FIG. 5, PWU_en 122 is asserted only when LV1_Detect 112 is asserted, STOP 132 is asserted, and safe 136 is not asserted. That is, when LVD1 110 detects Vbatt is below LV1 (thus asserting LV1_Detect 112), MCU 102 is in stop mode (STOP 132 is asserted), and MCU 102 is not in a safe state (safe 136 is not asserted), PWU 124 is enabled. Note that at all other combination of values for LV1_Detect 112, safe 136, and STOP 132, PWU_en 122 is not asserted such that PWU 124 is not enabled.

PWU 124 provides wakeup 126 to LVD2 enable unit 128. In one embodiment, wakeup 126 is a periodic pulse used to periodically enable LVD2 116 via LVD2 enable 128. That is, LVD2 enable unit 128 receives wakeup 126 and STOP 132 and provides LVD2_en 130 to LVD2 116 (and voltage regulator 114, if present). When LVD2_en 130 is asserted, LVD2 116 is enabled and monitors Vbatt to determine if Vbatt is above or below LV2. (Alternatively, as mentioned above, if voltage regulator 114 is present, LVD2 116 may instead monitor Vreg, which, at this point, may be approximately equal to Vbatt, to determine if Vbatt is above or below LV2). LVD2 enable unit 128 operates according to the truth table illustrated in FIG. 4. Therefore, when in run mode (when STOP 132 is not asserted), LVD2_en 130 is asserted, thus enabling LVD2 116. However, when in stop mode (STOP 132 is asserted), LVD2_en 130 is only asserted when wakeup 126 is asserted. In this manner, during stop mode and when Vbatt is between LV1 and LV2, LVD2 116 is periodically enabled by wakeup 126 so as to consume minimal power.

Referring back to the graph of FIG. 2, as Vbatt continues to decline, either due to a weakening battery or a removed battery, LVD2 116 detects when Vbatt reaches LV2, which is illustrated in FIG. 2 by point 182. Note that if MCU 102 was operating in stop mode, LVD2 116 detected Vbatt reaching LV2 during one of the periodic times determined by wakeup 126. However, if MCU 102 was operating in run mode, LVD2 116 is always enabled (i.e. LVD2_en 130 is always asserted, regardless of wakeup 126, when STOP 132 is deasserted) and detects Vbatt reaching LV2. As described above, LVD2 116 more accurately detects when Vbatt reaches LV2 than when LVD1 110 detects Vbatt reaching LV1. Upon reaching LV2, LVD2 116 asserts LV2_interrupt 118. Note that in one embodiment, LV2_interrupt 118 is assigned the highest priority to ensure that it is immediately acknowledged by interrupt handler 142. Therefore, in this embodiment, upon asserting LV2_interrupt 118, interrupt handler 142 allows CPU 160 to service the pending LVD2 116 interrupt. The interrupt service routine for servicing the LVD2 116 interrupt may contain instructions to allow for MCU 102 to safely shut down. For example, the interrupt service routine may save any desired information, including status information, into memory 158, may signal external peripherals 166, etc.

Since MCU 102 is now operating near Vmin (i.e. where Vbatt is approaching Vmin), MCU 102 should be placed in safe state prior to or upon reaching Vmin. In one embodiment, the interrupt service routine may include an instruction to set the safe bit register 134 to one to indicate that safe state has been entered. Note that when safe bit register 134 is set, safe 136 is asserted so as to inhibit interrupt handler 142 from acknowledging pending or future interrupts. For example, referring to FIG. 1, IH control unit 138 controls the responsiveness of interrupt handler 142 to external and internal interrupts. IH control unit 138 receives LV1_Detect 112 and safe 136 and selectively asserts IH_block 140 as illustrated by the truth table of FIG. 3. For example, IH control unit 138 only asserts IH_block 140 when both LV1_Detect 112 and safe 136 are asserted. When IH_block 140 is asserted, interrupt handler 142 is inhibited or blocked from acknowledging interrupts from external interrupts 144 or internal interrupts 146. Therefore, in one embodiment, each interrupt has a corresponding interrupt signal within external interrupts 144 or internal interrupts 146. Each interrupt signal may be individually inhibited by IH_block 140 by running each interrupt signal and IH_block 140 into an AND gate. Alternatively, other enabling or gating circuits may be used to inhibit the inputs to interrupt handler 142. In an alternate embodiment, IH_block 140 may be used to disable all or portions of interrupt handler 142 to achieve the blocking or inhibiting of interrupts. In yet another embodiment, IH_block 140 may be gated with the output of interrupt handler 142 to achieve the blocking or inhibiting of interrupts.

Note that in alternate embodiment, safe 136 may be implemented in different ways. For example, safe 136 may be asserted automatically (rather than by the interrupt service routine) in response to LVD2 116 detecting Vbatt (or, in some embodiments, Vreg) reaching LV2. Note also that safe bit register 134 may be located anywhere within MCU 102.

Referring back to FIG. 2, MCU 102 remains in the safe state until Vbatt again rises above LV1. That is, when a new battery is inserted, or the current battery is recharged, Vbatt will once again rise above LV1 at which point safe state is exited and safe bit register 134 is reset to 0, thus deasserting safe 136. MCU 102 is therefore again capable of acknowledging interrupts and of safely exiting stop mode and returning to run mode. Alternatively, safe bit register 134 is not reset upon Vbatt rising above LV1. In this embodiment, safe bit register may be cleared by the user upon or at some point after waking up MCU 102.

In one embodiment of the present invention, LVD1 110 can also be used to detect when Vbatt falls below a power-on-reset voltage (VPOR) which is less than Vmin (as illustrated in FIG. 2). When Vbatt reaches VPOR, typically the RAM and internal logic states are completely or partially corrupted. If Vbatt reaches VPOR prior to replacing or charging the battery, MCU 102 needs to be reinitialized upon the replacement or charging of the battery due to the corruption of data. Note also that in some embodiments, a reset interrupt or a power-on-reset interrupt may have a higher priority than the LVD2 116 interrupt described above.

FIG. 6 illustrates in schematic form one embodiment of an LVD circuit 200 that may be used for LVD1 110 of FIG. 1. LVD circuit 200 includes a comparator 212, transistors 208, 204, and 206, and current sources 202 and 210. Current source 202 has a first terminal coupled to Vbatt, and a second terminal coupled to a positive input of comparator 212 (Vref) and a first current electrode of transistor 204. Current source 202 provides a current Iref to the positive input of comparator 212 and the first current electrode of transistor 204. A second current electrode of transistor 204 is coupled to a control electrode of transistor 204 and a first current electrode of transistor 206. A control electrode of transistor 206 and a second current electrode of transistor 206 are coupled to each other, to a second terminal of current source 210, and to a ground node. A first current electrode of transistor 208 is coupled to Vbatt, and a control electrode and a second current electrode of transistor 208 is coupled to a negative input of comparator 212 (Vcomp) and to a first terminal of current source 210. Current source 210 provides a current Icomp. An output of comparator 212 provides LVD1_Detect 112. Note that in the illustrated embodiment, transistors 204 and 208 are p-type MOSFET transistors, and transistor 206 is a bipolar transistor. However, in alternate embodiments, other types of transistors may be used. Also, different circuit configurations may be used to provide LVD1_Detect 112.

In operation, current source 202 is used to bias transistors 206 and 204 to produce a reference voltage Vref. The value of Vref is equal to the sum of the base to emitter voltage (Vbe) of transistor 206 and the threshold voltage (Vtp) of transistor 204. Current source 210 is used to bias transistor 208 to produce Vcomp which is equal to Vbatt minus the threshold voltage (Vtp) of transistor 208. Vcomp is monitored in relation to Vref by comparator 212. When Vcomp is above Vref, the output of comparator 212 is low (deasserted, in this embodiment). Whenever Vbatt falls low enough such that Vcomp becomes less than or equal to Vref, then the comparator output switches from low to high, indicating the detection of a low voltage condition. Thus, at this point, LVD1_Detect 112 is asserted indicating that Vbatt has reached LV1.

Current sources 202 and 210 used in LVD circuit 200 have very low values of current. Because of this, LVD circuit 200 has less noise immunity than would ordinarily be desired for a low voltage detect function. However, in one embodiment, the operation of LVD circuit 200 is only important when MCU 102 is in low power stop mode and all clocks are inactive. The reference voltage, Vref, generated by LVD circuit 200 is not highly accurate due to variations in process parameters and temperature. However, since this circuit is not used to generate an interrupt to MCU 102 to cause the system to shut down, high accuracy is not required, as described above. That is, LVD1 110 is only used to enable the more accurate LVD2 116 under appropriate conditions and to hold MCU 102 in a low power safe state until sufficient voltage has been restored externally (by Vbatt) to allow MCU 102 to begin processing again.

FIG. 7 illustrates in schematic form one embodiment of an LVD circuit 300 that may be used for LVD2 116 of FIG. 1. LVD circuit 300 includes a bandgap circuit 302, resistors 306 and 304, and a comparator 308. Vbatt (or Vreg, if voltage regulator 114 is present) is coupled to a first terminal of bandgap circuit 302 and a first terminal of resistor 306. A second terminal of bandgap circuit 302 is coupled to a positive input of comparator 308 to provide Vref, and a third terminal of bandgap circuit 302 is coupled to a first terminal of resistor 304 and to a ground node. A second terminal of resistor 306 is coupled to a second terminal of resistor 304 and to a negative input of comparator 308. Comparator 308 has an output to provide LVD2_interrupt 118. Note that different embodiments may use different circuit configurations to provide LVD2_interrupt 118.

LVD circuit 300 uses a bandgap reference circuit (bandgap circuit 302) to produce an accurate reference voltage Vref. Resistors 306 and 304 form a voltage divider between Vreg and ground which is used to produce a voltage for comparison to the reference. Whenever Vbatt (or Vreg) falls low enough that Vcomp becomes less than or equal to Vref, the output of comparator 308 switches from low to high, indicating the detection of a low voltage condition (i.e. asserting LVD2_interrupt 118. (Note that bandgap circuit 302 can be any bandgap circuit, as known in the art.) Bandgap circuit 302 and the divider formed by resistors 306 and 304 draw more current than can be allowed for stop mode in some applications. For this reason, LVD2 110 (using LVD circuit 300) is disabled when MCU 102 enters low power stop mode. Therefore, it can be appreciated how different types of LVD circuits may be used for LVD1 110 and LVD2 116 where a balance can be achieved between current consumption and accuracy.

Although the invention has been described with respect to specific conductivity types or polarity of potentials, skilled artisans appreciated that conductivity types and polarities of potentials may be reversed.

In the foregoing specification, the invention has been described with reference to specific embodiments. However, one of ordinary skill in the art appreciates that various modifications and changes can be made without departing from the scope of the present invention as set forth in the claims below. For example, the block diagrams may have different blocks than those illustrated and may have more or less blocks or be arranged differently. Also, some blocks may be combined. For example, an alternate embodiment may combine the functions of LVD1 110 and LVD2 116 into a single LVD system capable of operating in a high power and a low power mode and capable of providing an indicator when Vbatt falls below LV1 and another indicator when Vbatt falls below LV2. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An integrated circuit comprising:
    a power supply pin for receiving power from a power source;
    a first voltage detection circuit having an output to provide a first voltage detection signal indicative of a first voltage level of the power supply pin;
    a second voltage detection circuit having an output to provide a second voltage detection signal indicative of a second voltage level of the power supply pin, the second voltage level different from the first voltage level;
    a central processing unit, the central processing unit configured to be powered from power received via the power supply pin;
    an interrupt handler operably coupled to the central processing unit, the interrupt handler responsive to a set of at least one interrupt;
    an interrupt handler control circuit controlling the responsiveness of the interrupt handler to the set of at least one interrupt, the interrupt handler control circuit is responsive to the first voltage detection signal and responsive to a first signal having a first signal state which is at least indicative that the voltage level of the power supply pin had dropped below the second voltage level as indicated by the second voltage detection signal, wherein when the first signal is at the first signal state, the interrupt handler control circuit enables the interrupt handler to be responsive to the set of at least one interrupt when the first voltage detection signal indicates that the voltage level of the power supply pin is above the first voltage level.

2. The integrated circuit of claim 1 wherein the first signal is set to the first signal state via a processing operation of the central processing unit.

3. The integrated circuit of claim 2 further comprising a register including contents, the signal state of the first signal being dependent upon the contents of the register, the contents of the register being programmable by the processing operation of the central processing unit.

4. The integrated circuit of claim 2 wherein:
the output of the second voltage detection circuit is coupled to the interrupt handler, wherein the second voltage detection signal indicating that the voltage level of the power supply pin is below the second voltage level generates an interrupt;
the central processing unit performs the processing operation to set the first signal to the first signal state at least in response to the interrupt generated when the second voltage detection signal indicates that the voltage level of the power supply pin is below the second voltage level.

5. The integrated circuit of claim 1 wherein the integrated circuit has a low power stop mode wherein the second voltage detection circuit is disabled from providing the second voltage detection signal when the integrated circuit is in the low power stop mode.

6. The integrated circuit of claim 1 further comprising:
a wakeup circuit having an output to enable the second voltage detection circuit to provide the second voltage detection signal when at least the integrated circuit is in a low power stop mode and the first voltage detection signal indicates that the voltage level of the power supply pin is below the first voltage level.

7. The integrated circuit of claim 6 wherein the output of the wake up circuit enables the second voltage detection circuit to provide the second voltage detection signal when at least the integrated circuit is in a low power stop mode, the first voltage detection signal indicates that the voltage level of the power supply pin is below the first voltage level, and the first signal is at a second signal state different than the first signal state.

8. The integrated circuit of claim 6 wherein the wakeup circuit is a periodic wakeup circuit, wherein the output provides a periodic signal to enable the second voltage detection circuit to provide the second voltage detection signal when at least the integrated circuit is in a low power stop mode and the first voltage detection signal indicates that the voltage level of the power supply pin is below the first voltage level.

9. The integrated circuit of claim 1 wherein the interrupt handler control circuit controls the responsiveness of the interrupt handler to the set of at least one interrupt by gating the at least one interrupt signal into the interrupt handler.

10. A system capable of battery powered operation including the integrated circuit of claim 1 and further comprising:
a battery coupled to the power supply pin for supplying power to the power supply pin; and
an external peripheral operably coupled to the integrated circuit via at least one signal line pin of the integrated circuit.

11. The system of claim 10 further comprising:
a power storage capacitor coupled to the power supply pin.

12. In a data processing system having an interrupt handler selectively responsive to a set of at least one interrupt, an method comprising:
receiving power from a power source at a power supply pin;
providing a first voltage detection signal indicative of a first voltage level of the power supply pin;
providing a second voltage detection signal indicative of a second voltage level of the power supply pin, the second voltage level different from the first voltage level;
providing a first signal having a first signal state which is at least indicative that the voltage level of the power supply pin had dropped below the second voltage level as indicated by the second voltage detection signal; and
when the first signal is at the first signal state, enabling the interrupt handler to be responsive to the set of at least one interrupt when the first voltage detection signal indicates that the voltage level of the power supply pin is above the first voltage level.

13. The method of claim 12 further comprising:
generating an interrupt when the second voltage detection signal indicates that the voltage level of the power supply pin is below the second voltage level; and
setting the first signal to the first signal state at least in response to the interrupt generated when the second voltage detection signal indicates that the voltage level of the power supply pin is below the second voltage level.

14. The method of claim 12 further comprising not providing the second voltage detection signal when the data processing system is in a low power stop mode.

15. The method of claim 12 further comprising:
providing the second voltage detection signal when at least the integrated circuit is in a low power stop mode and the first voltage detection signal indicates that the voltage level of the power supply pin is below the first voltage level.

16. The method of claim 12 further comprising:
providing the second voltage detection signal when at least the integrated circuit is in the low power stop mode, the first voltage detection signal indicates that the voltage level of the power supply pin is below the first voltage level, and the first signal is at a second signal state different than the first signal state.

17. The method of claim 12 further comprising:
periodically providing the second voltage detection signal when at least the integrated circuit is in the low power stop mode and the first voltage detection signal indicates that the voltage level of the power supply pin is below the first voltage level.

18. The method of claim 12 further comprising gating the at least one interrupt signal to control the responsiveness of the interrupt handler to the set of at least one interrupt.

19. The method of claim 12 further comprising:
providing a central processing unit configured to be powered from power received via the power supply pin.

20. The method of claim 19 further comprising:
the central processing unit performing a processing operation to set the first signal to the first signal state.

* * * * *